(12) United States Patent
Tourapis et al.

(10) Patent No.: US 8,085,845 B2
(45) Date of Patent: Dec. 27, 2011

(54) METHOD AND APPARATUS FOR ENCODING HYBRID INTRA-INTER CODED BLOCKS

(75) Inventors: Alexandros Tourapis, West Windsor, NJ (US); Jill MacDonald Boyce, Manalapan, NJ (US); Peng Yin, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1554 days.

(21) Appl. No.: 10/569,236

(22) PCT Filed: Aug. 24, 2004

(86) PCT No.: PCT/US2004/027434
§ 371 (c)(1),
(2), (4) Date: Feb. 22, 2006

(87) PCT Pub. No.: WO2005/022920
PCT Pub. Date: Mar. 10, 2005

(65) Prior Publication Data
US 2007/0047648 A1 Mar. 1, 2007

Related U.S. Application Data

(60) Provisional application No. 60/497,816, filed on Aug. 26, 2003.

(51) Int. Cl.
*H04N 7/12* (2006.01)
(52) U.S. Cl. .................... 375/240.16; 348/620
(58) Field of Classification Search ............. 375/240.03, 375/240.16, 240.05, 240.17, 240.13; 348/620
See application file for complete search history.

(56) References Cited

U.S. PATENT DOCUMENTS 5,574,663 A * 11/1996 Ozcelik et al. ................ 709/247
5,659,363 A   8/1997 Wilkinson
(Continued)

FOREIGN PATENT DOCUMENTS
CN      1141561      1/1997
(Continued)

OTHER PUBLICATIONS

Flierl M. et al.: "A locally optimal design algorithm for block-based multi-hypothesis motion-compensated prediction" Data Compression Conference, 1998, DCC 98. Proceedings Snowbird, UT, USA Mar. 30, Apr. 1, 1998, Los Alamitos, CA USA IEEE Comput. Soc. US, Mar. 30, 1998, pp. 239-248.

(Continued)

*Primary Examiner* — Emmanuel Bayard
(74) *Attorney, Agent, or Firm* — Robert D. Shedd; Paul P. Kiel; Guy H. Eriksen

(57) ABSTRACT

A hybrid intra-inter bi-predictive (or multi-predictive) coding mode allows both intraframe (intra) and interframe (inter) predictions to be combined together for hybrid-encoding a current macroblock or a subblock. Bi-prediction may be used also in I-pictures, combining two intra predictions that use two different intra prediction directions. A video encoder processes data representing a two-dimensional video image which has been produced by a conventional commercially available video camera. The video encoder is adapted to select, for coding a current macroblock, between an intra encoding mode, an P-frame inter encoding mode, a B-frame bi-predictive inter mode, and a hybrid intra-inter bi-predictive encoding mode. A video decoder receives and decodes a data stream that may contain a block/macroblock encoded in accordance with the hybrid intra-inter bi-predictive encoding mode.

31 Claims, 4 Drawing Sheets

U.S. PATENT DOCUMENTS

| | | | |
|---|---|---|---|
| 6,389,073 B1 | 5/2002 | Kurobe et al. | |
| 6,532,264 B1* | 3/2003 | Kahn | 375/240.16 |
| 6,665,346 B1 | 12/2003 | Lee et al. | |
| 6,898,243 B1 | 5/2005 | Alvarez | |
| 2001/0019634 A1* | 9/2001 | Lainema et al. | 382/268 |
| 2001/0055338 A1* | 12/2001 | Machida | 375/240.16 |
| 2004/0022316 A1* | 2/2004 | Ueda et al. | 375/240.05 |
| 2004/0095511 A1* | 5/2004 | Amara et al. | 348/620 |
| 2004/0160645 A1 | 8/2004 | Nonaka et al. | |
| 2005/0008240 A1* | 1/2005 | Banerji et al. | 382/238 |
| 2005/0276323 A1* | 12/2005 | Martemyanov et al. | 375/240.03 |
| 2005/0281334 A1* | 12/2005 | Walker et al. | 375/240.16 |
| 2008/0104647 A1 | 5/2008 | Hannuksela | |

FOREIGN PATENT DOCUMENTS

| | | |
|---|---|---|
| EP | 0607042 | 7/1994 |
| EP | 0727910 | 8/1996 |
| JP | 03080784 | 4/1991 |
| JP | 7274176 | 10/1995 |
| JP | 2000-059769 | 2/2000 |
| JP | 2002359852 | 12/2002 |
| WO | WO03047272 | 6/2003 |

OTHER PUBLICATIONS

Al-Mualla M. et al.: "Multiple-reference temporal error concealment" ISCAS 2001. Proceedings of the 2001 IEEE International Symposium on Circuits and Systems. Sydney, Australia, May 6-9, 2001 IEEE International Symposium on Circuits and Systems, New York, NY IEEE, US vol. 1 of 5, May 6, 2001, pp. 149-152.

Wiegand T. et al.: "Overview of the H.264/AVC Video Coding Standard" IEEE Transactions on Circuits and Systems for Video Technology, IEEE Inc. New York, US vol. 13, No. 7, Jul. 2003, pp. 560-576.

Schwarz, Heiko: Weigand, Thomas: "Core Experiment.Results on Improved Macroblock Prediction Modes" ITU Study Group 16, Jan. 29, 2002, Feb. 1, 2002, pp. 1-12.

Schwarz, Heiko: Wiegand, Thomas; "Tree Structured Macroblock Partition" ITU Study Group 16, Dec. 4-6, 2001, pp. 1-9.

Search Report dated Nov. 16, 2004.

* cited by examiner

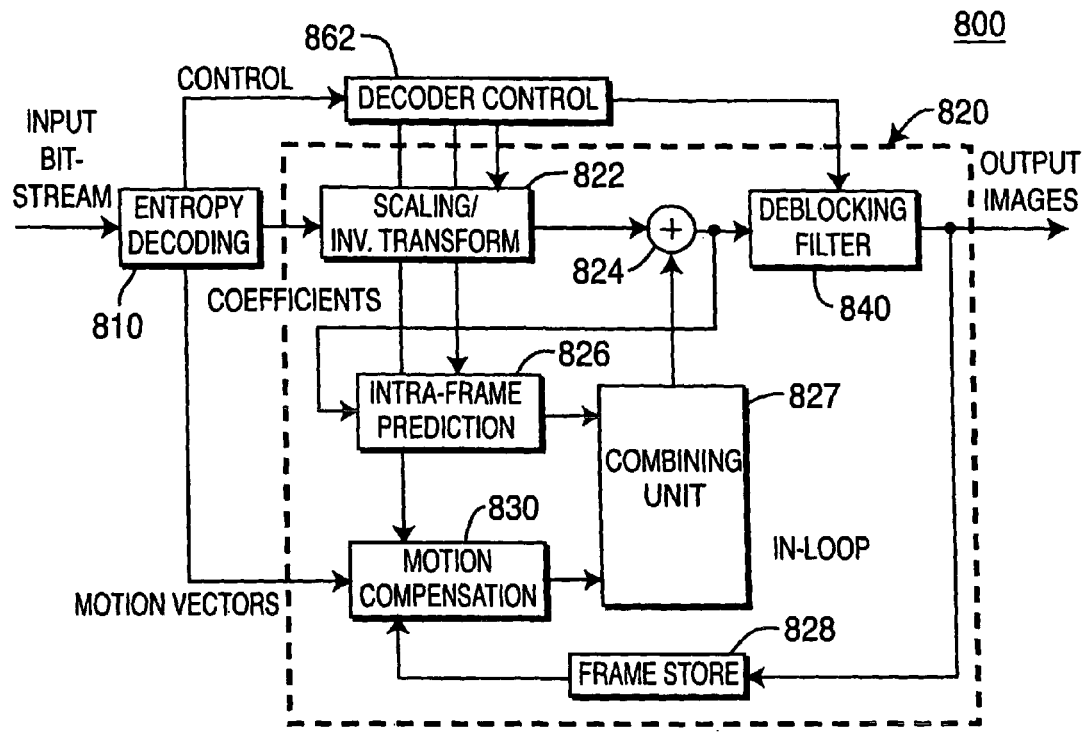
FIG. 8
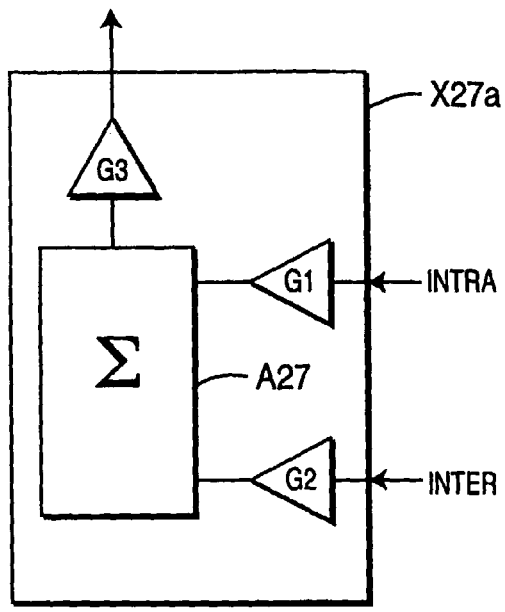 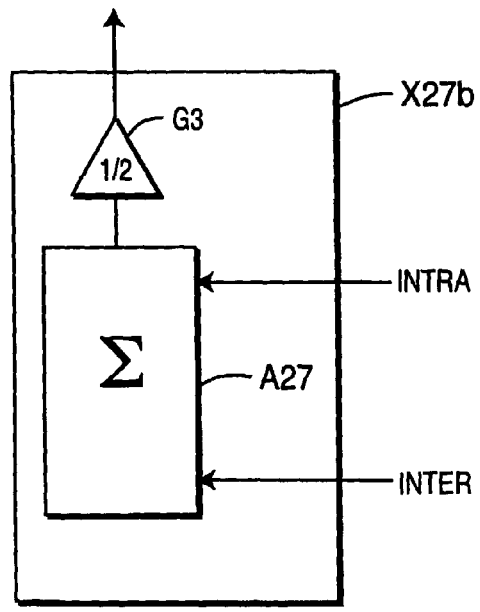
FIG. 9A  FIG. 9B

METHOD AND APPARATUS FOR ENCODING HYBRID INTRA-INTER CODED BLOCKS

CROSS-REFERENCE TO RELATED APPLICATION

This application claims the benefit, under 35 U.S.C. §365 of International Application PCT/US2004/27434, filed Aug. 24, 2004, which was published in accordance with PCT Article 21(2) on Mar. 10, 2005 in English and which claims the benefit of U.S. Provisional Patent Application No. 60/497,816, filed Aug. 26, 2003, which is incorporated by reference herein in its entirety. Furthermore, this application is related to International Application PCT/US2004/27397, also filed Aug. 24, 2004, and which is also entering the U.S. national phase concurrently with the instant application.

FIELD OF THE INVENTION

The invention relates generally to digital video CODECs, and more particularly to the hybrid use of both intra and inter coding for macroblocks.

BACKGROUND OF THE INVENTION

A video encoder can be used to encode one or more frames of an image sequence into digital information. This digital information may then be transmitted to a receiver, where the image or the image sequence can then be re-constructed (decoded). The transmission channel itself may include any of a number of possible channels for transmission. For example, the transmission channel might be a radio channel or other means for wireless broadcast, coaxial Cable Television cable, a GSM mobile phone TDMA channel, a fixed line telephone link, or the Internet. This list of transmission means is only illustrative and is by no means meant to be all-inclusive.

Various international standards have been agreed upon for video encoding and transmission. In general, a standard provides rules for compressing and encoding data relating to frames of an image. These rules provide a way of compressing and encoding image data to transmit less data than the viewing camera originally provided about the image. This reduced volume of data then requires less channel bandwidth for transmission. A receiver can re-construct (or decode) the image from the transmitted data if it knows the rules that the transmitter used to perform the compression and encoding. The H.264 standard minimizes redundant transmission of parts of the image, by using motion compensated prediction of macroblocks from previous frames.

Video compression architectures and standards, such as MPEG-2 and JVT/H.264/MPEG 4 Part10/AVC, encode a macroblock using only either an intraframe ("intra") coding or an interframe ("inter") coding method for the encoding of each macroblock. For interframe motion estimation/compensation, a video frame to be encoded is partitioned into non-overlapping rectangular, or most commonly, square blocks of pixels. For each of these macroblocks, the best matching macroblock is searched from a reference frame in a predetermined search window according to a predetermined matching error criterion. Then the matched macroblock is used to predict the current macroblock, and the prediction error macroblock is further processed and transmitted to the decoder. The relative shifts in the horizontal and vertical directions of the reference macroblock with respect to the original macroblock are grouped and referred to as the motion vector (MV) of the original macroblock, which is also transmitted to the decoder.

The main aim of motion estimation is to predict a macroblock such that the difference macroblock obtained from taking a difference of the reference and current macroblocks produces the lowest number of bits in encoding.

For intra coding, a macroblock (MB) or a sub-macroblock within a picture is predicted using spatial prediction methods. For inter coding, temporal prediction methods (i.e. motion estimation/compensation) are used. Generally, inter prediction (coding) methods are usually more efficient than intra coding methods. In the existing architectures/standards, specific picture or slice types are defined which specify or restrict the intra or inter MB types that can be encoded for transmission to a decoder. In intra (I) pictures or slices, only intra MB types can be encoded, while on Predictive (P) and Bi-predictive (B) pictures or slices, both intra and inter MB types may be encoded.

An I-picture or I-slice contains only intra coded macroblocks and does not use temporal prediction. The pixel values of the current macroblock are first spatially predicted from their neighboring pixel values. The residual information is then transformed using a N×N transform (e.g., 4×4 or 8×8 DCT transform) and then quantized.

B-pictures or B-slices, introduce the concept of bi-predictive (or in a generalization multiple-prediction) inter coded macroblock types, where a macroblock (MB) or sub-block is predicted by two (or more) interframe predictions. Due to bi-prediction, B pictures usually tend to be more efficient in coding than both I and P pictures.

A P-picture or B-picture may contain different slice types, and macroblocks encoded by different methods. A slice can be of I (Intra), P (Predicted), B (Bi-predicted), SP (Switching P), and SI (Switching I) type.

Intra and Inter prediction methods have been used separately, within video coding architectures and standards such as MPEG-2 and H.264. For intra coded macroblocks, available spatial samples within the same frame or picture are used to predict current macroblocks, while in inter prediction, temporal samples within other pictures or other frames, are instead used. In the H.264 standard, two different intra coding modes exist: a 4×4 intra mode which performs the prediction process for every 4×4 block within a macroblock; and a 16×16 intra mode, for which the prediction is performed for the entire macroblock in a single step.

Each frame of a video sequence is divided into so-called "macroblocks", which comprise luminance (Y) information and associated (potentially spatially sub-sampled depending upon the color space) chrominance (U, V) information. Macroblocks are formed by representing a region of 16×16 image pixels in the original image as four 8×8 blocks of luminance (luma) information, each luminance block comprising an 8×8 array of luminance (Y) values; and two spatially corresponding chrominance components (U and V) which are sub-sampled by a factor of two in the horizontal and vertical directions to yield corresponding arrays of 8×8 chrominance (U, V) values.

In 16×16 spatial (intra) prediction mode the luma values of an entire 16×16 macroblock are predicted from the pixels around the edges of the MB. In the 16×16 Intra prediction mode, the 33 neighboring samples immediately above and/or to the left of the 16×16 luma block are used for the prediction of the current macroblock, and that only 4 modes (0 vertical, 1 horizontal, 2 DC, and 3 plane prediction) are used.

FIG. 1 illustrates the intraframe (intra) prediction sampling method for the 4×4 intra mode in the H.264 standard of the related art. The samples of a 4×4 luma block 110 to be intra encoded containing pixels "a" through "p" in FIG. 1 are predicted using nearby pixels "A" through "M" in FIG. 1 from neighboring blocks. In the decoder, samples "A" through "M" from previous macroblocks of the same picture/frame typically have been already decoded and can then used for prediction of the current macroblock 110.

FIG. 2 illustrates, for the 4×4 luma block 110 of FIG. 1 the nine intra prediction modes labeled 0, 1, 3, 4, 5, 6, 7, and 8. Mode 2 is the 'DC-prediction'. The other modes (1, 3, 4, 5, 6, 7, and 8) represent directions of predictions as indicated by the arrows in FIG. 2.

The intra macroblock types that are defined in the H.264 standard are as follows:

TABLE 1

Intra Macroblock types

| mb_type | Name of mb_type | MbPartPredMode (mb_type, 0) | Intra16x16 PredMode | CodedBlock PatternChro | CodedBlock PatternLuma |
|---|---|---|---|---|---|
| 0 | I_4x4 | Intra_4x4 | NA | NA | NA |
| 1 | I_16x16_0_0_0 | Intra_16x16 | 0 | 0 | 0 |
| 2 | I_16x16_1_0_0 | Intra_16x16 | 1 | 0 | 0 |
| 3 | I_16x16_2_0_0 | Intra_16x16 | 2 | 0 | 0 |
| 4 | I_16x16_3_0_0 | Intra_16x16 | 3 | 0 | 0 |
| 5 | I_16x16_0_1_0 | Intra_16x16 | 0 | 1 | 0 |
| 6 | I_16x16_1_1_0 | Intra_16x16 | 1 | 1 | 0 |
| 7 | I_16x16_2_1_0 | Intra_16x16 | 2 | 1 | 0 |
| 8 | I_16x16_3_1_0 | Intra_16x16 | 3 | 1 | 0 |
| 9 | I_16x16_0_2_0 | Intra_16x16 | 0 | 2 | 0 |
| 10 | I_16x16_1_2_0 | Intra_16x16 | 1 | 2 | 0 |
| 11 | I_16x16_2_2_0 | Intra_16x16 | 2 | 2 | 0 |
| 12 | I_16x16_3_2_0 | Intra_16x16 | 3 | 2 | 0 |
| 13 | I_16x16_0_0_1 | Intra_16x16 | 0 | 0 | 15 |
| 14 | I_16x16_1_0_1 | Intra_16x16 | 1 | 0 | 15 |
| 15 | I_16x16_2_0_1 | Intra_16x16 | 2 | 0 | 15 |
| 16 | I_16x16_3_0_1 | Intra_16x16 | 3 | 0 | 15 |
| 17 | I_16x16_0_1_1 | Intra_16x16 | 0 | 1 | 15 |
| 18 | I_16x16_1_1_1 | Intra_16x16 | 1 | 1 | 15 |
| 19 | I_16x16_2_1_1 | Intra_16x16 | 2 | 1 | 15 |
| 20 | I_16x16_3_1_1 | Intra_16x16 | 3 | 1 | 15 |
| 21 | I_16x16_0_2_1 | Intra_16x16 | 0 | 2 | 15 |
| 22 | I_16x16_1_2_1 | Intra_16x16 | 1 | 2 | 15 |
| 23 | I_16x16_2_2_1 | Intra_16x16 | 2 | 2 | 15 |
| 24 | I_16x16_3_2_1 | Intra_16x16 | 3 | 2 | 15 |
| 25 | I_PCM | NA | NA | NA | NA |

FIG. 3 depicts a current macroblock 310 to be inter coded in a P-frame or P-slice using temporal prediction, instead of spatial prediction, by estimating a motion vector (i.e., MV, Motion Vector) between the best match (BM) among the blocks of two pictures (301 and 302). In inter coding, a current block 310 in the current frame 301 is predicted from a displaced matching block (BM) in the previous frame 302. Every inter coded block (e.g., 310) is associated with a set of motion parameters (motion vectors and a reference index ref_idx), which provide to the decoder a corresponding location within the reference picture (302) associated with ref_idx from which all pixels in the block 310 can be predicted. The difference between the original block (310) and its prediction (BM) is compressed and transmitted along with the displacement motion vectors (MV). Motion can be estimated independently for either 16×16 macroblock or any of its sub-macroblock partitions: 16×8, 8×16, 8×8, 8×4, 4×8, 4×4. An 8×8 macroblock partition is known as a sub-macroblock (or subblock). Hereinafter, the term "block" generally refers to a rectangular group of adjacent pixels of any dimensions, such as a whole 16×16 macroblock and/or a sub-macroblock partition. Only one motion vector (MV) per sub-macroblock partition is allowed. The motion can be estimated for each macroblock from different frames either in the past or in the future, by associating the macroblock with the selected frame using the macroblock's ref_idx.

A P-slice may also contain intra coded macroblocks. The intra coded macroblocks within a P-slice are compressed in the same way as the intra coded macroblocks in an I-slice. Inter coded blocks are predicted using motion estimation and compensation strategies.

If all the macroblocks of an entire frame are encoded and transmitted using intra mode, it is referred to as transmission of an 'INTRA frame' (I-Frame or I-Picture). An INTRA frame therefore consists entirely of intra macroblocks. Typically, an INTRA frame must be transmitted at the start of an image transmission, when the receiver as yet holds no received macroblocks. If a frame is encoded and transmitted by encoding some or all of the macroblocks as inter macroblocks, then the frame is referred to as an 'INTER frame'. Typically, an INTER frame comprises less data for transmission than an INTRA frame. However, the encoder decides whether a particular macroblock is transmitted as an intra coded macroblock or an inter coded macroblock, depending on which is most efficient.

Every 16×16 macroblock to be inter coded in a P-slice may be partitioned into 16×8, 8×16, and 8×8 partitions. A sub-macroblock may itself be partitioned into 8×4, 4×8, or 4×4 sub-macroblock partition. Each macroblock partition or sub-macroblock partition in H.264 is assigned to a unique motion vector. Inter coded Macroblocks and macroblock partitions have unique prediction modes and reference indices. It is not allowed in the current H.264 standard for inter and intra predictions to be selected and mixed together in different partitions of the same macroblock. In the H.264/AVC design adopted in February 2002, the partitioning scheme initially adopted from Wiegand et al included support of switching between intra and inter on a sub-macroblock (8×8 luma with 4×4 chroma) basis. This capability was later removed in order to reduce decoding complexity.

In P-pictures and P-slices, the following additional block types are defined:

TABLE 2

Inter Macroblock types for P slices

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 0 | P_L0_16x16 | 1 | Pred_L0 | NA | 16 | 16 |
| 1 | P_L0_L0_16x8 | 2 | Pred_L0 | Pred_L0 | 16 | 8 |
| 2 | P_L0_L0_8x16 | 2 | Pred_L0 | Pred_L0 | 8 | 16 |
| 3 | P_8x8 | 4 | NA | NA | 8 | 8 |
| 4 | P_8x8ref0 | 4 | NA | NA | 8 | 8 |
| Inferred | P_Skip | 1 | Pred_L0 | NA | 16 | 16 |

FIG. 4 illustrates the combination of two (temporal) predictions for inter coding a macroblock in a B-Picture or B-Slice.

As illustrated in FIG. 4, for a macroblock 410 to be inter coded within B-pictures or B-slices, instead of using only one "Best Match" (BM) predictor (prediction) for a current macroblock, two (temporal) predictions (BML0 and BML1) are used for the current macroblock 410, which can be averaged together to form a final prediction. In a B-picture or B-slice, up to two motion vectors (MVL0 and MVL1), representing two estimates of the motion, per sub-macroblock partition are allowed for temporal prediction. They can be from any reference pictures (List 0 Reference and List 1 Reference), subsequent or prior. The average of the pixel values in the Best Matched blocks (BML0 and BML1) in the (List 0 and List 1) reference pictures are used as the predictor. This standard also allows weighing the pixel values of each Best Matched block (BML0 and BML1) unequally, instead of averaging them. This is referred to as a Weighted Prediction mode and is useful in the presence of special video effects, such as fading. A B-slice also has a special mode—Direct mode. The spatial methods used in MotionCopy skip mode, and the Direct mode are restricted only on the estimation of the motion parameters and not of the macroblocks (pixels) themselves, and no spatially adjacent samples are used. In Direct mode the motion vectors for a macroblock are not explicitly sent.

The following macroblock types are defined for use in B-pictures and B-slices:

TABLE 3

Inter Macroblock types for B slices

| mb_type | Name of mb_type | NumMbPart (mb_type) | MbPartPredMode (mb_type, 0) | MbPartPredMode (mb_type, 1) | MbPartWidth (mb_type) | MbPartHeight (mb_type) |
|---|---|---|---|---|---|---|
| 0 | B_Direct_16x16 | NA | Direct | NA | 8 | 8 |
| 1 | B_L0_16x16 | 1 | Pred_L0 | NA | 16 | 16 |
| 2 | B_L1_16x16 | 1 | Pred_L1 | NA | 16 | 16 |
| 3 | B_Bi_16x16 | 1 | BiPred | NA | 16 | 16 |
| 4 | B_L0_L0_16x8 | 2 | Pred_L0 | Pred_L0 | 16 | 8 |
| 5 | B_L0_L0_8x16 | 2 | Pred_L0 | Pred_L0 | 8 | 16 |
| 6 | B_L1_L1_16x8 | 2 | Pred_L1 | Pred_L1 | 16 | 8 |
| 7 | B_L1_L1_8x16 | 2 | Pred_L1 | Pred_L1 | 8 | 16 |
| 8 | B_L0_L1_16x8 | 2 | Pred_L0 | Pred_L1 | 16 | 8 |
| 9 | B_L0_L1_8x16 | 2 | Pred_L0 | Pred_L1 | 8 | 16 |
| 10 | B_L1_L0_16x8 | 2 | Pred_L1 | Pred_L0 | 16 | 8 |
| 11 | B_L1_L0_8x16 | 2 | Pred_L1 | Pred_L0 | 8 | 16 |
| 12 | B_L0_Bi_16x8 | 2 | Pred_L0 | BiPred | 16 | 8 |
| 13 | B_L0_Bi_8x16 | 2 | Pred_L0 | BiPred | 8 | 16 |
| 14 | B_L1_Bi_16x8 | 2 | Pred_L1 | BiPred | 16 | 8 |
| 15 | B_L1_Bi_8x16 | 2 | Pred_L1 | BiPred | 8 | 16 |
| 16 | B_Bi_L0_16x8 | 2 | BiPred | Pred_L0 | 16 | 8 |
| 17 | B_Bi_L0_8x16 | 2 | BiPred | Pred_L0 | 8 | 16 |
| 18 | B_Bi_L1_16x8 | 2 | BiPred | Pred_L1 | 16 | 8 |
| 19 | B_Bi_L1_8x16 | 2 | BiPred | Pred_L1 | 8 | 16 |
| 20 | B_Bi_Bi_16x8 | 2 | BiPred | BiPred | 16 | 8 |
| 21 | B_Bi_Bi_8x16 | 2 | BiPred | BiPred | 8 | 16 |
| 22 | B_8x8 | 4 | NA | NA | 8 | 8 |
| inferred | B_Skip | NA | Direct | NA | 8 | 8 |

In B-slices, as shown in the above table, the two temporal predictions are always restricted to using the same block type.

Deblocking filters, and Overlapped Block Motion Compensation (OBMC) use some spatial correlation. According to these methods, the reconstructed pixels, after prediction and the addition of the associated residual, are spatially processed/filtered depending upon their mode (intra or inter), position (MB/block edges, internal pixels etc), motion information, associated residual, and the surrounding pixel difference. This process can considerably reduce blocking artifacts and improve quality, but on the other hand can also increase complexity considerably (especially within the decoder). This process also may not always yield the best results and it may itself introduce additional blurring on the edges.

SUMMARY OF THE INVENTION

Existing video compression standards (e.g., MPEG-2 and H.264) do not allow both intraframe (intra) and interframe (inter) predictions to be combined together (like the combination of two interframe predictions in the inter-only bi-prediction) for encoding a current macroblock or a subblock.

In accordance with the principles of the present invention, provision is made for the combination of intra predictions and inter predictions in the encoding and decoding of a given macroblock, subblock, or partition. The combination of intra and inter predictions enables improved gain and/or encoding efficiency and/or might further reduce video data error propagation.

An embodiment of the invention provides for video encoding a block by combining a first prediction of a current block with a second prediction of a current block; wherein the first prediction of the current block is intra prediction and the second prediction of the current block is inter prediction.

Throughout the following description it will be assumed that the luminance (luma) component of a macroblock comprises 16×16 pixels arranged as an array of 4 8×8 blocks, and that the associated chrominance components are spatially sub-sampled by a factor of two in the horizontal and vertical directions to form 8×8 blocks. Extension of the description to other block sizes and other sub-sampling schemes will be apparent to those of ordinary skill in the art. The invention is not limited by the 16×16 macroblock structure but can be used in any segmentation based video coding system.

BRIEF DESCRIPTION OF THE DRAWINGS

The above features of the present invention will become more apparent by describing in detail exemplary embodiments thereof with reference to the attached drawings in which:

FIG. 8, is a block diagram illustrating a video decoder, in accordance with the principles of the invention; and FIGS. 9A and 9B are block diagrams illustrating circuits for combining intra and inter predictions in the encoder of FIG. 7 or the decoder of FIG. 8.

DETAILED DESCRIPTION OF THE INVENTION

Figure 1:
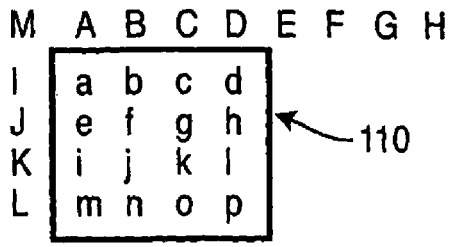
FIG. 1 shows the samples near a 4×4 pixel luma block to be intra coded, in accordance with the H.264 standard.
Figure 2:
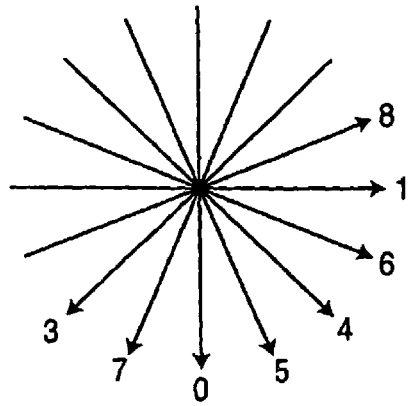
FIG. 2 illustrates, the nine directions of predictions encoding for the 4×4 block of FIGS, in accordance with the H.264 standard.
Figure 3:
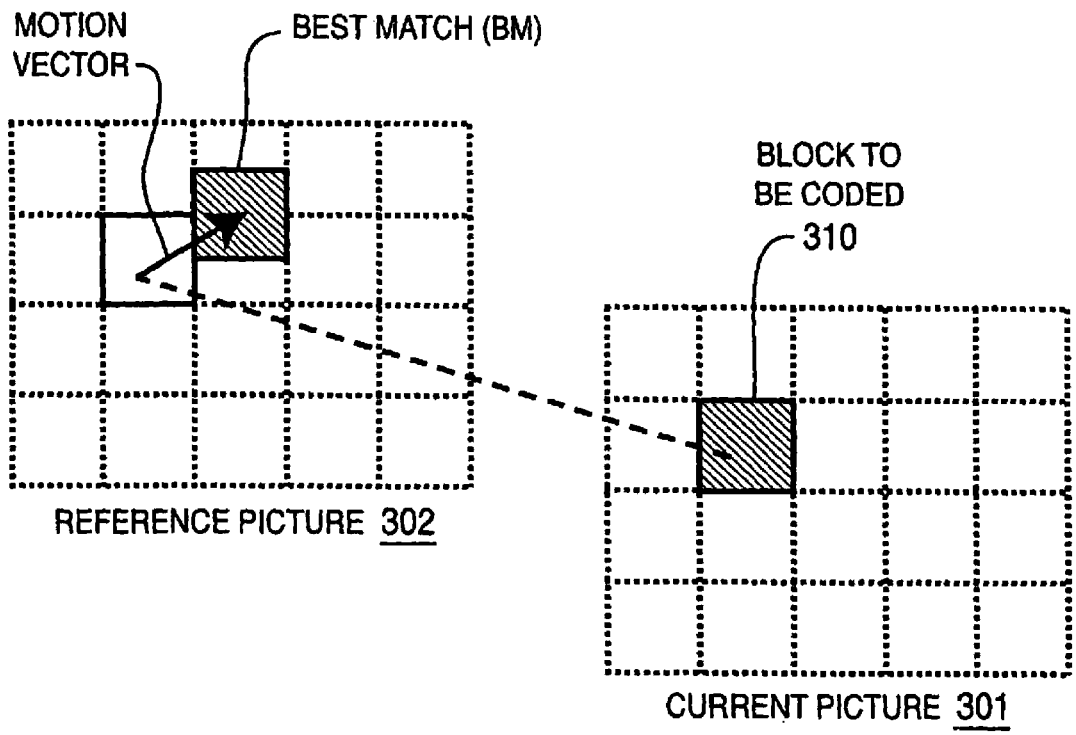
FIG. 3 depicts a macroblock being inter coded by estimating a motion vector, in accordance with the H.264 standard.
Figure 4:
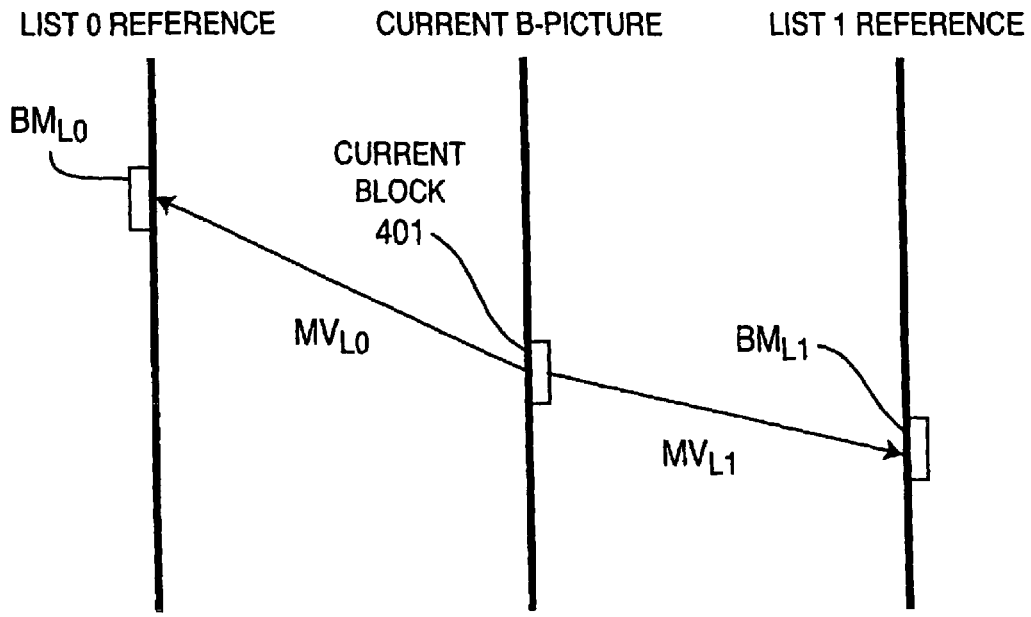
FIG. 4 illustrates the Bi-prediction of a macroblock by combining two inter codings, in accordance with the H.264 standard.
Figure 5:
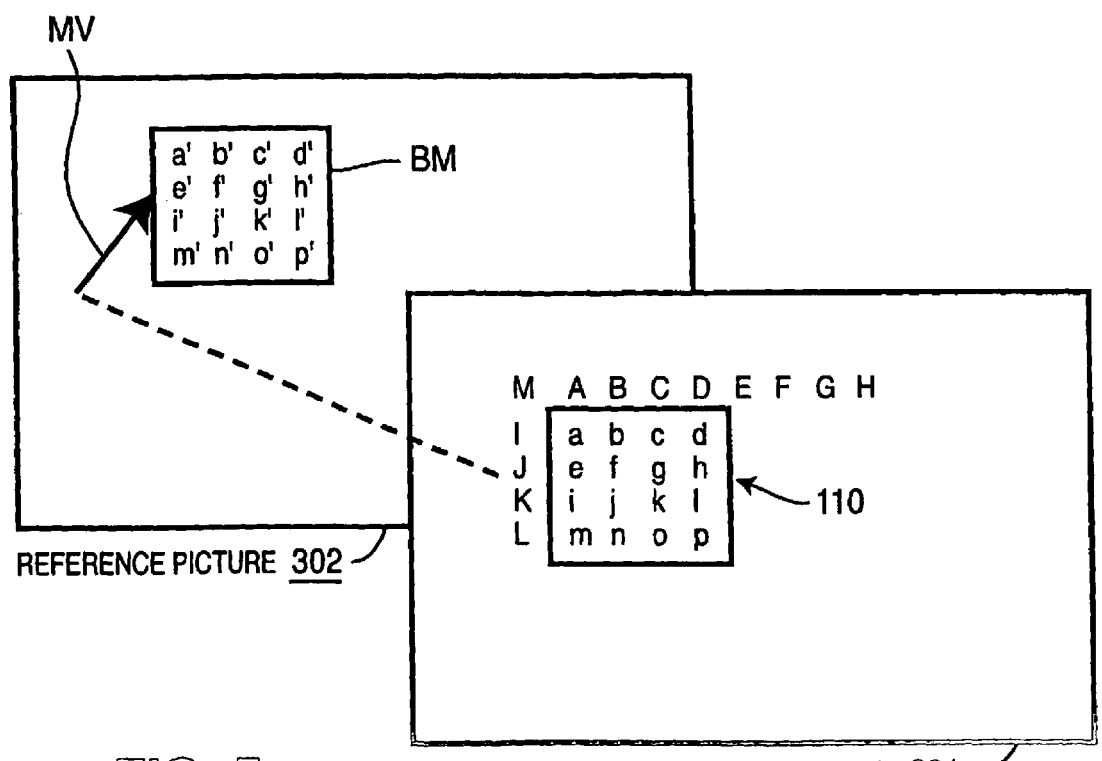
FIG. 5 depicts intra-inter hybrid bi-prediction of a 4×4 block combining inter and intra prediction, in accordance with the principles of the invention.

FIG. 5 depicts an example of hybrid intra-inter bi-prediction where the same 4×4 block is predicted using inter and intra prediction. FIG. 5 illustrates a new bi-prediction mode type, herein called the intra-inter hybrid coding mode, distinguished from the intra-only (FIGS. 1 and 2) and inter-only (FIGS. 3 and 4) prediction modes of the related art, which unlike the related art, can combine both spatial ("A" through "M", 301) and temporal (MV, 302) predictions to bi-predictively encode the current macroblock or current subblock 110. This new bi-predictive (or multi-predictive) mode, provides that two (or more) predictions, which may include one or more intra predictions, are to be used (combined) for making the final prediction of a given block or macroblock. Bi-prediction may be used also in I-pictures, with combined intra-intra predictions. These two intra predictions could use two different intra prediction directions.

The disclosed hybrid bi-predictive coding mode allows both intraframe (intra) and interframe (inter) predictions to be combined together (e.g., averaged, or weighted) for encoding a current macroblock, sub-macroblock, or partition. In the accordance with the principles of the present invention, the related art's method of combining predictions (bi-prediction or multi-prediction) is extended by providing for the combination of intra predictions and inter predictions for the encoding of a given macroblock, sub-macroblock, or partition. The combination of intra and inter predictions allows for improved gain and/or encoding efficiency and/or may reduce video data error propagation.

Embodiments of the invention provide several new macroblock modes/types that can be integrated within a video encoder and decoder and could further improve performance as compared with existing architectures. The new macroblock modes are similar to the bi-predictive (or multi-predictive) macroblock modes already used in several encoding architectures and standards such as MPEG-2 and H.264, in the sense that they use two or more predictions for each macroblock or sub-block, but they differ in the sense that they can also use (or only use) intraframe (spatial) prediction, as contrasted with conventional inter-only (temporal) bi-prediction. It is possible for example, that the combination of two different intra predictions or the combined usage of inter and intra predictions would give a better prediction for a given macroblock, while it could also be beneficial in reducing blocking artifacts given that adjacent spatial samples may be considered during the performance of the disclosed bi-prediction coding method. The disclosed method of combining intra and inter predictions for coding the same macroblock or subblock can lead to higher performance because a) either prediction may contain important distinct information that is not preserved if only a single prediction is used, b) either picture may contain different encoding artifacts that can be reduced through averaging, or weighting, c) averaging functions as a noise reduction mechanism etc.

Additionally, the disclosed bi-predictive (or multi-predictive) macroblock coding mode supports inter prediction modes that are not constrained to use the same partition types, and allows the use of all possible combinations of intra and single-list inter types that are defined in Tables 1 through 3. The disclosed bi-predictive (or multi-predictive) macroblock coding mode supports inter and intra predictions to be performed based upon different partitions of the same macroblock to be coded. For example, if only up to two (bi) predictions per macroblock are allowed for a hybrid intra-inter coded macroblock, the first prediction could be intra4×4 (mb_type 0 in Table 1) while the second prediction could be the 16×8 list 1 block prediction (mb_type 6 in Table 3).

Syntax and Submode Types

The prediction type(s) employed in hybrid-encoding each macroblock are signaled within the bitstream, either in a combined form (like the form used for B slices in H.264) or separately (i.e., using a tree structure). Optionally, the number of predictions (e.g., 1, 2 or more) could also be signaled within the bit stream. The combined signaling method employed in the related art would necessitate the enumeration of all possible or the most likely combinations of prediction type(s) and may not result in the highest compression gain.

The compression gain can be optimized by employing a separate tree-structured architecture, signaling separately each prediction mode. This method allows the use of all possible combinations of intra and single-list inter types that are defined in Tables 1 through 3, while keeping syntax simple. For example, if only up to two (bi) predictions per macroblock are allowed for a hybrid-coded macroblock the first prediction could be intra4×4 (mb_type 0 in Table 1) while the second prediction could be the 16×8 list I block prediction (mb_type 6 in Table 3). For these additional submodes their associated parameters also need to be transmitted, such as the intra direction and/or the associated reference indices and motion vectors. This approach allows various combinations, such as both/all predictions being intra but having different directions, or being different-list predictions, or using different block partitions.

It may also be preferable to make adjustments and extensions to the submodes provided in the H. 264 standard, since (a) some combinations are identical, and (b) it may be desirable in some cases to use a single prediction for a macroblock. For example, for case (a), we may disallow identical prediction modes and automatically adjust the submode types, while for case (b) we can introduce the following additional modes, which define a new Null block prediction type that implies no prediction:

TABLE 4

Null SubMacroblock types

| B_Null_L0_16x8 | 2 | Null | Pred_L0 | 16 | 8 |
|---|---|---|---|---|---|
| B_Null_L0_8x16 | 2 | Null | Pred_L0 | 8 | 16 |
| B_Null_L1_16x8 | 2 | Null | Pred_L1 | 16 | 8 |
| B_Null_L1_8x16 | 2 | Null | Pred_L1 | 8 | 16 |
| B_L0_Null_16x8 | 2 | Pred_L0 | Null | 16 | 8 |
| B_L0_Null_8x16 | 2 | Pred_L0 | Null | 8 | 16 |
| B_L1_Null_16x8 | 2 | Pred_L1 | Null | 16 | 8 |
| B_L1_Null_8x16 | 2 | Pred_L1 | Null | 8 | 16 |

A combination of two null prediction block types for the same sub partition (e.g. B_Null_L0_0×16 and B_Null_L1_8×16) is forbidden, which again implies that adapting the related art's mb_type table would provide further advantages. A similar extension could be made for 8×8 subblocks/partitions. Because all bi-predictive modes defined in Table 3 can be supported by the disclosed hybrid mode, they could be eliminated as redundant.

Extending Direct Mode with Hybrid Intra-Inter Bi-Prediction

The spatial Direct mode used in H.264 can be extended with an hybrid intra-inter bi-prediction mode embodiment of the invention. Currently, the motion vectors for a Direct mode block are determined based on the median of the motion vectors of the three neighboring blocks.

If the bi-prediction mode of at least one neighbor is hybrid (inter-intra), then the prediction mode of the current (Direct mode) block could also be hybrid (inter-inter). This method of prediction could be restricted according to the availability of prediction lists utilized by the neighboring blocks. For example if both lists are available in the spatial neighbors, then the motion vectors of a Direct mode block are calculated again using median prediction regardless if one of the neighbors utilizes hybrid prediction. On the other hand, if only one list is available (e.g. list_1), while one of the neighbors utilizes hybrid prediction, then the Direct mode block will be predicted with hybrid prediction as well, while also utilizing the same available list. Further, if more than one adjacent blocks utilize hybrid prediction, then some simple rules can be defined regarding the intra mode that is to be used for the prediction. For example, Intra 16×16 should for this case supercede Intra4×4 due to its simplicity for the prediction. Intra4×4 could also be disallowed within Direct mode blocks, but if used, then every 4×4 block direction may be predicted initially using the external macroblock predictions if available. If no external Intra4×4 macroblock is available, then the lowest intra mb_type available from the adjacent blocks is used. In general, if the prediction mode of more than one of the spatially neighboring blocks is intra, then the lowest order intra prediction is preferably used, while intra is preferably not used if both lists are available. Intra is also not used if the samples required for the prediction are not available.

In-Loop Deblocking Filter

Video encoders in accordance with the H.264/AVC standard may employ an in-loop deblocking filter to increase the correlation between adjacent pixels mainly at block and macroblock MB edges and to reduce the blockiness (blocking artifacts) introduced in a decoded picture. The filtered decoded pictures are used to predict the motion for other pictures. The deblocking filter is an adaptive filter that adjusts its strength depending upon compression mode of a macroblock (Intra or Inter), the quantization parameter, motion vector, frame or field coding decision and the pixel values. For smaller quantization sizes the filter shuts itself off. This filter can also be shut-off explicitly by an encoder at the slice level. Different strengths and methods for the deblocking filter are employed depending on the adjacent block coding types, motion and transmitted residual. By taking advantage of the features of an embodiment of the current invention, since the hybrid intra-inter macroblock type already contains an intra predictor that considers adjacent pixels during its encoding, the strength of the deblocking filter may be modified accordingly. For example, if a block is hybrid coded and its prediction mode uses two (or more) predictions, of which one is intra, and has additional coefficients, then the filter strength for the corresponding edges can be reduced (e.g., by one).

Figure 6:
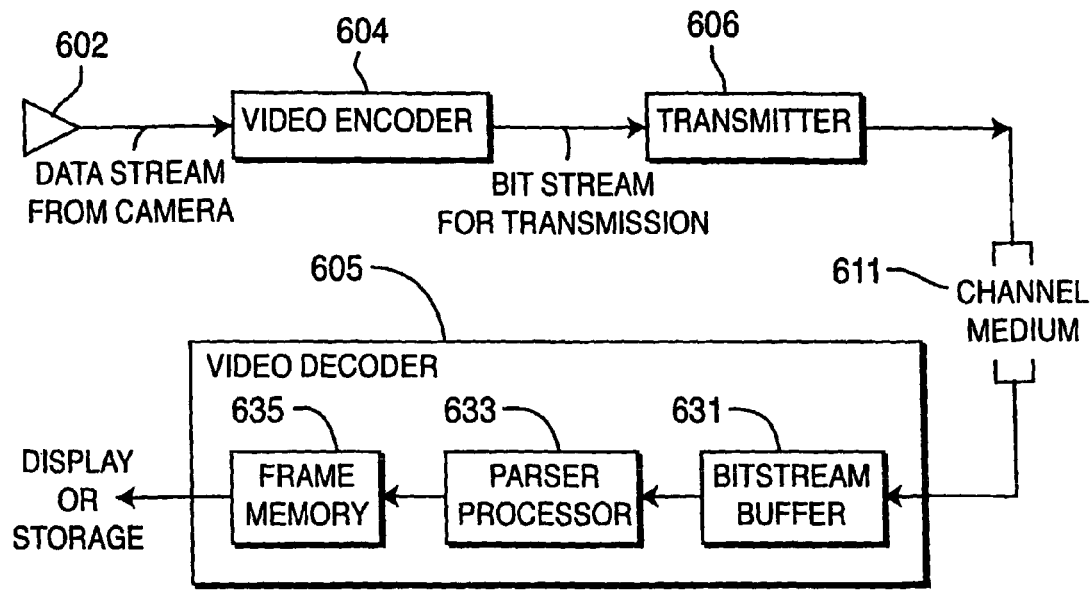
FIG. 6 is a block diagram illustrating a video encoder and a video decoder, in accordance with the principles of the invention.

FIG. 6 shows a block schematic diagram illustrating a video encoder 604 and a video decoder 605 in accordance with an embodiment of the present invention. Encoder 604 receives data about an image sequence from a video source 602, e.g., a camera. After compressing and encoding the data from the camera in accordance with the methods herein disclosed, the encoder 604 passes the information to a transmission system 606. Transmitter 606 transmits the bitstream containing the hybrid-encoded macroblocks over a channel medium 611. The transmission channel medium 611 may be via wireless, cable, or any other transmission or routing scheme. The circuitry of either encoder 604 or decoder 605 may, for example, form part of a mobile or a portable two-way radio, or a mobile phone.

The moving image decoding apparatus (decoder 605) on the decoding side of the channel medium 611 receives the bitstream in a bitstream buffer 631, and parses the bitstream (with bitstream parser-processor 633) and decodes the encoded image data from a intra coded frame A, stores the decoded image data of the frame A in a frame memory 635. Upon reception of inter encoded difference data, the decoding apparatus (decoder 605) generates a motion compensation predicted image from the decoded data of the frame A. If there is no error in the received data of the frame A, since the decoded image of the frame A matches the local decoded image of the frame A on the encoding apparatus (encoder 604) side, the motion compensation predicted image generated from this decoded data matches the motion compensation predicted image on the encoding apparatus (encoder 604) side. Since the encoding apparatus (encoder 604) sends out the difference image between the original image and the motion compensation predicted image, the decoding apparatus can generate a decoded image of the frame B by adding the motion compensation predicted image to the received difference image. If the data of the frame A received by the decoding apparatus contains an error, a correct decoded image of the frame A cannot be generated. As a consequence, all images generated from the error-containing portion of the motion compensation predicted image become erroneous data. These erroneous data remain until refresh processing is performed by intra-encoding.

When the decoder 605 receives hybrid-encoded Bi-predictive data, hybrid-coded block data containing intra coded information can be employed at the decoder to prevent or arrest the propagation of image data errors. Some portions or areas of or objects within an image or sequence of images may be identifiable by the user or by the encoding apparatus as being more important or more susceptible of errors than others areas. Thus, the encoding apparatus (encoder 604) may be adapted to selectively hybrid-encode the macroblocks in the more-important areas or objects in a frame sequence, so that image data error propagation in those areas is prevented or reduced.

Figure 7:
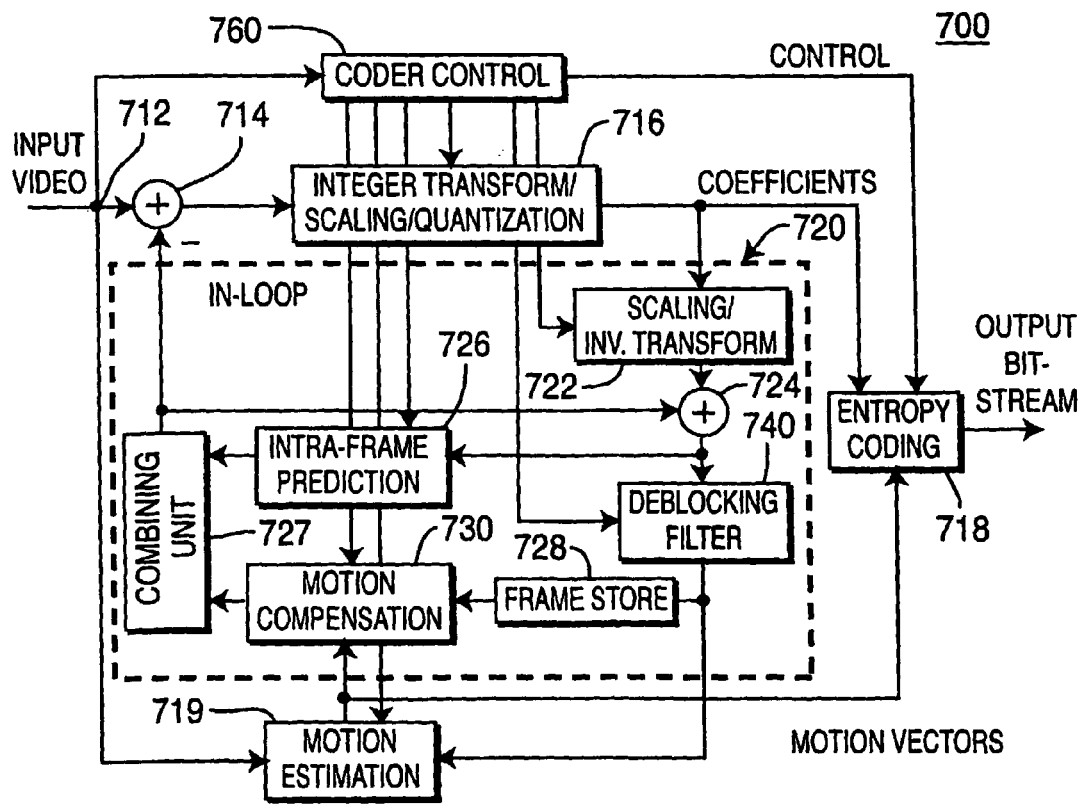
FIG. 7, is a block diagram illustrating a video encoder, in accordance with the principles of the invention.

FIG. 7 depicts an exemplary encoder, according to an embodiment of the invention, indicated generally by the reference numeral 700. The encoder 700 includes a video input terminal 712 that is coupled in signal communication to a positive input of a summing block 714. The summing block 714 is coupled, in turn, to a function block 716 for implementing an integer transform to provide coefficients. The function block 716 is coupled to an entropy coding block 718 for implementing entropy coding to provide an output bitstream. The function block 716 is further coupled to-an in-loop portion 720 at a scaling and inverse transform block 722. The function block 722 is coupled to a summing block 724, which, in turn, is coupled to an intra-frame prediction block 726. The intra-frame prediction block 726 is a first input of a combining unit 727, the output of which is coupled to a second input of the summing block 724 and to an inverting input of the summing block 714.

The output of the summing block 724 is coupled to a deblocking filter 740. The deblocking filter 740 is coupled to a frame store 728. The frame store 728 is coupled to a motion compensation (inter-frame prediction) block 730, which is coupled to a second input of the combining unit 727.

The combining unit 727 combines a first (intra) prediction, from the intra-frame prediction block 726, with a second (inter) prediction from the motion compensation (inter-frame prediction) block 730, to output a resulting combined (hybrid intra-inter) prediction to the second input of the summing block 724 and to an inverting input of the summing block 714. In some embodiments of the invention, the combining unit 727 may be implemented as a summing block (e.g., similar to summing block 724 or 714) operatively coupled to one or more gain blocks (See FIG. 9A), to produce either an "average" of the input intra and inter predictions, or a differently weighted combination of the intra and inter predictions. In other embodiments of the invention, the combining unit 727 may be implemented as a sequential adder circuit adapted to combine a first intra prediction from the intra-frame prediction block 726 with a second (e.g., subsequent) intra prediction from the intra-frame prediction block 726; and further adapted to combine a first (intra) prediction from the intra-frame prediction block 726 with a second (inter) prediction from the motion compensation (inter-frame prediction) block 730.

The video input terminal 712 is further coupled to a motion estimation block 719 to provide motion vectors. The deblocking filter 740 is coupled to a second input of the motion estimation (inter-frame prediction) block 719. The output of the motion estimation block 719 is coupled to the motion compensation (inter-frame prediction) block 730 as well as to a second input of the entropy coding block 718.

The video input terminal 712 is further coupled to a coder control block.760. The coder control block 760 is coupled to control inputs of each of the blocks 716, 718, 719, 722, 726, 730, and 740 for providing control signals to control the operation of the encoder 700.

FIG. 8, depicts an exemplary decoder, according to an embodiment of the invention, indicated generally by the reference numeral 800. The decoder 800 includes an entropy decoding block 810 for receiving an input bitstream. The decoding block 810 is coupled for providing coefficients to an in-loop portion 820 at a scaling and inverse transform block 822. The inverse transform block 822 is coupled to a summing block 824, which, in turn, is coupled to an intra-frame prediction block 826. The intra-frame prediction block 826 is coupled to a first input of a combining unit 827, the output of which is coupled to a second input of the summing block 824.

The output of the summing block 824 is coupled to a deblocking filter 840 for providing output images. The deblocking filter 840 is coupled to a frame store 828.

The frame store 828 is coupled to a motion compensation (inter-frame prediction) block 830, which is coupled to a second input of the combining unit 827. The decoding block 810 is further coupled for providing motion vectors to a second input of the motion compensation (inter-frame prediction) block 830.

The decoder combining unit 827 is similar in function to the combining unit 727 in the encoder of FIG. 7 in that it combines a first (intra) prediction, from the intra-frame prediction block 826, with a second (inter) prediction from the motion compensation (inter-frame prediction) block 830, to output a resulting combined (hybrid intra-inter) prediction to the second input of the summing block 824. In some embodiments of the invention, the combining unit 827 may be implemented as a summing block (e.g., similar to summing block 824) operatively coupled to one or more gain blocks (See FIG. 9A), to produce either an "average" of the input intra and inter predictions, or a differently weighted combination of the intra and inter predictions. In other embodiments of the invention, the combining unit 827 may be implemented as a sequential adder circuit adapted to combine a first intra prediction from the intra-frame prediction block 826 with a second (e.g., subsequent) intra prediction from the intra-frame prediction block 826; and further adapted to combine a first (intra) prediction from the intra-frame prediction block 826 with a second (inter) prediction from the motion compensation (inter-frame prediction) block 830.

The entropy decoding block 810 is further coupled for providing input to a decoder control block 862. The decoder control block 862 is coupled to control inputs of each of the blocks 822, 826, 830, and 840 for communicating control signals and controlling the operation of the decoder 800.

FIGS. 9A and 9B are block schematic diagrams each illustrating an exemplary embodiment of the combining unit (e.g., 727 or 827) in the encoder of FIG. 7 or in the decoder of FIG. 8, comprising circuits for additively combining a first and second prediction, e.g., additively combining an intra and an inter prediction. FIG. 9A depicts an exemplary combining unit x27-a (e.g., for implementing combining unit 727 and 827) including a adder circuit (denoted by the Sigma signal) A27 being adapted to combine a first intra prediction from the coupled intra-frame prediction block (e.g., 726 or 826) with a second (e.g., subsequent) intra prediction from the intra-frame prediction block (e.g., 726 or 826); and being further adapted to combine a first (intra) prediction from the intra-frame prediction block (e.g., 726 or 826) with a second (inter) prediction from the motion compensation (inter-frame prediction) block (e.g., 730 or 830). Digital Gain Blocks G1, G2, and G3 provide for weighting, (or simply averaging), of the plurality (e.g., two) predictions to be combined. Persons skilled in the art will recognize that in alternative embodiments of the invention, fewer than three (e.g. one or two) digital gain blocks may be provided to combine two predictions, for example, as depicted in FIG. 9B.

FIG. 9B depicts an exemplary combining unit x27-b (e.g., 727 and 827) including a adder circuit (denoted by the Sigma signal) A27 being adapted to average a first intra prediction from the intra-frame prediction block (e.g., 726 or 826) with a second (e.g., subsequent) intra prediction from the intra-frame prediction block (e.g., 726 or 826); and being further adapted to average a first (intra) prediction from the intra-frame prediction block (e.g., 726 or 826) with a second (inter) prediction from the motion compensation (inter-frame prediction) block (e.g., 730 or 830). Digital Gain Block G3 being fixed at a gain value of one half (½) provides for dividing (averaging) the sum of two predictions output from the adder circuit (denoted by the Sigma signal) A27.

Various aspects of the present invention can be implemented in software, which may be run in a general purpose computer or any other 'suitable computing environment. The present invention is operable in a number general purpose or special purpose computing environments such as personal computers, general-purpose computers, server computers, hand-held devices, laptop devices, multiprocessors, microprocessors, set top boxes, programmable consumer electronics, network PCs, minicomputers, mainframe computers, distributed computing environments and the like to execute computer-executable instructions, for performing a frame-to-frame digital video encoding of the present invention, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Exemplary embodiments of the invention have been explained above and are shown in the figures. However, the present invention is not limited to the exemplary embodiments described above, and it is apparent that variations and modifications can be effected by those skilled in the art within the spirit and scope of the present invention. Therefore, the exemplary embodiments should be understood not as limitations but as examples. The scope of the present invention is not determined by the above description but by the accompanying claims and variations and modifications may be made to the embodiments of the invention without departing from the scope of the invention as defined by the appended claims and equivalents.

The invention claimed is:

1. In a video encoder, a method for video encoding a block comprising: combining a first prediction of a current block with a second prediction of a current block; wherein the first prediction of the current block is intra prediction and the second prediction of the current block is inter prediction.

2. The method of claim 1, wherein encoding the block includes combining the first prediction and the second prediction and a third prediction of the current block.

3. The method of claim 1, wherein the current block is coded as a Direct mode block.

4. The method of claim 1, further comprising reducing the filter strength of a deblocking filter adapted to increase the correlation between pixels adjacent to the current block.

5. The method of claim 1, wherein the second prediction is a null block prediction.

6. The method of claim 1, wherein the first prediction and the second prediction are combined by averaging the first prediction and the second prediction.

7. The method of claim 1, wherein the first prediction and the second prediction are combined by weighting each of the first prediction and the second prediction.

8. The method of claim 1, wherein the current block is a 16 ×16 macroblock.

9. The method of claim 1, wherein the current block is a sub-macroblock.

10. The method of claim 1, wherein the current block is a 4 ×4 sub-macroblock partition.

11. A non-transitory computer-usable medium having a computer-readable program code embodied therein for causing a computer system to perform the method of claim 1.

12. A non-transitory recording medium that stores a program, readable by a computer, for causing a computer system to perform the method of claim 1.

13. In a video encoder, a method of video encoding for compressing and encoding frames of a two-dimensional image sequence for transmission comprising: dividing a frame of the image sequence into blocks, selecting blocks and encoding the selected blocks in a bi-predictive hybrid intra-inter encoding mode into a bitstream for transmission.

14. The method of video encoding of claim 13 further comprising transmitting the bitstream containing the intra-inter encoded blocks.

15. A video encoder for encoding blocks within frames of a sequence of two dimensional images, the encoder comprising: an intra-frame prediction block being operatively connected to a combining unit and for outputting a first intra prediction of a block; and an inter-frame prediction block being operatively connected to the combining unit and for outputting a first inter prediction of the block; wherein the combining unit is adapted to combine the first intra prediction and the first inter prediction and to output a hybrid intra-inter coded block.

16. The video encoder of claim 15 wherein the combining unit is adapted to weight at least one of the first intra prediction of the block and the first inter prediction of the block prior to additively combining them.

17. The video encoder of claim 15 wherein the combining unit is adapted to average together the first intra prediction of the block and the first inter prediction of the block.

18. The video encoder of claim 15 wherein the hybrid intra-inter coded block is the average of the first intra prediction and the first inter prediction.

19. The video encoder of claim 15, wherein the intra-frame prediction block is adapted to output a second intra prediction of the block; and the wherein the combining unit is further adapted to additively combine the first intra prediction and the second intra prediction.

20. The video encoder of claim 15, wherein the inter-frame prediction block is further adapted to output a second inter prediction of the block; and wherein the combining unit is further adapted to combine the first inter prediction and the second inter prediction.

21. A mobile telephone comprising a video encoder as claimed in claim 15.

22. A video encoder for compressing and encoding frames of a two dimensional image sequence for transmission, the video encoder being adapted to select blocks from at least one frame of the image sequence and to encode the selected blocks by combining a first prediction and a second prediction, wherein the encoder is further adapted to select for encoding one of the selected blocks, between an intra encoding mode of the related art, an inter encoding mode of the related art, and a bi-predictive hybrid intra-inter encoding mode.

23. The video encoder of claim 22, wherein the second prediction is an inter prediction of the current block.

24. The video encoder of claim 22, wherein the second prediction is an intra prediction of the current block.

25. The video encoder of claim 22 wherein coding the current block in the hybrid intra-inter encoding mode outputs the average of the intra prediction of the current block and an inter prediction of the current block.

26. The video encoder of claim 22 wherein coding the current block in the hybrid intra-inter encoding mode outputs a weighted additive combination of the intra prediction of the current block and an inter prediction of the current block.

27. A multimedia terminal, comprising a video encoder adapted to encode a digital video sequence using motion compensated prediction, said digital video sequence comprising a number of frames, wherein the video encoder is adapted to select blocks from at least one frame of the image sequence and to encode the selected blocks; wherein encoding each of the blocks includes combining a first prediction and a second prediction, wherein the encoder is further adapted to select for encoding one of the selected blocks, between an intra encoding mode of the related art, an inter encoding mode of the related art, and a bi-predictive hybrid intra-inter encoding mode.

28. In a video encoder, a method for video encoding a block comprising: combining a first prediction type for a current block with a second prediction type for a current block; wherein the combination of the first prediction type and the second prediction type forms a hybrid prediction type.

29. The method of claim 28 wherein the step of combining is accomplished using a summing block.

30. The method of claim 28 wherein the step of combining the two prediction types is accomplished by performing a simple average of the two prediction types.

31. The method of claim 28 wherein the step of combining the two prediction types is accomplished by applying a weighted combination of the two prediction types.

* * * * *